United States Patent
Marndi et al.

(10) Patent No.: US 11,050,837 B2
(45) Date of Patent: Jun. 29, 2021

(54) PROVIDING CLOUD SERVICES ASSOCIATED WITH UNUSED HARDWARE RESOURCES OF PRIVATE CLOUD PROVIDERS

(71) Applicant: HEWLETT PACKARD ENTERPRISE DEVELOPMENT LP, Houston, TX (US)

(72) Inventors: Raj Narayan Marndi, Karnataka (IN); Sagar Ratnakara Nikam, Karnataka (IN); Mayuri Ravindra Joshi, Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/263,015

(22) Filed: Jan. 31, 2019

(65) Prior Publication Data

US 2020/0252475 A1  Aug. 6, 2020

(51) Int. Cl.
*H04L 29/08* (2006.01)
*G06F 9/455* (2018.01)
*G06F 9/50* (2006.01)

(52) U.S. Cl.
CPC ...... *H04L 67/2833* (2013.01); *G06F 9/45558* (2013.01); *G06F 9/5077* (2013.01); *H04L 67/02* (2013.01); *H04L 67/1023* (2013.01)

(58) Field of Classification Search
CPC . H04L 67/2833; H04L 67/1023; H04L 67/02; G06F 9/45558; G06F 9/5077
See application file for complete search history.

(56) References Cited

U.S. PATENT DOCUMENTS

| 2011/0145413 | A1 | 6/2011 | Dawson et al. |
| 2012/0284408 | A1* | 11/2012 | Dutta ............... G06F 9/5066 709/226 |
| 2014/0075501 | A1* | 3/2014 | Srinivasan ........... H04L 63/104 726/1 |

(Continued)

FOREIGN PATENT DOCUMENTS

WO   WO-2016127315   8/2016

OTHER PUBLICATIONS

Ahmed, A. et al.; "A New Approach to Manage and Utilize Cloud Computing Underused Resources"; International Journal of Computer Applications (0975-8887), vol. 76—No. 11, Aug. 2013, 8 pp.

(Continued)

*Primary Examiner* — Nicholas R Taylor
*Assistant Examiner* — Sanjoy Roy
(74) *Attorney, Agent, or Firm* — Jaffery Watson Mendonsa & Hamilton (57) ABSTRACT

A technique includes providing, by a computer, a portal to provide a catalog describing features of a plurality of cloud services available and to be provided by otherwise unused hardware resources of a plurality of private cloud providers. The technique includes, by the computer, in response to input received through the portal selecting a given cloud service for a tenant, exposing the given cloud service to the tenant. Exposing the given cloud service to the user includes requesting a given cloud provider corresponding to the given cloud service to configure the given cloud provider to provide the given cloud service to the tenant.

20 Claims, 6 Drawing Sheets

(56) References Cited

U.S. PATENT DOCUMENTS

| | | | |
|---|---|---|---|
| 2014/0075568 A1* | 3/2014 | Sathyadevan | G06F 21/6218 |
| | | | 726/27 |
| 2015/0100471 A1* | 4/2015 | Curry, Jr. | H04L 41/5029 |
| | | | 705/37 |
| 2015/0373012 A1* | 12/2015 | Bartz | H04L 63/0823 |
| | | | 726/7 |
| 2015/0381425 A1 | 12/2015 | Kansal et al. | |
| 2017/0139736 A1 | 5/2017 | Messerli | |
| 2017/0149687 A1* | 5/2017 | Udupi | H04L 47/78 |
| 2017/0171146 A1* | 6/2017 | Sharma | H04L 67/2804 |
| 2017/0295199 A1* | 10/2017 | Kirti | H04L 63/1416 |

OTHER PUBLICATIONS

Gigenet.com; "Cloud Computing is Still Dangerously Underutilized"; htttph://www.gigenet.com/blog/underutilizing-cloud-computing-resources/ Nov. 21, 2017; 2 pp.

Cloud28+ Logo, "Cloud28plus", available online at <https://web.archive.org/web/20180916120259/https://www.cloud28plus.com/emea>, Sep. 16, 2018, 11 pages.

Larry Dignan, "Ready for a cloud computing brokerage?", available online at <https://www.zdnet.com/article/ready-for-a-cloud-computing-brokerage/>, Oct. 21, 2010, 13 pages.

Wikipedia, "Cloud Computing", available online at https://en.wikipedia.org/w/index.php?title=Cloud_computing&oldid=880963936>, Jan. 30, 2019, 20 pages.

* cited by examiner

PROVIDING CLOUD SERVICES ASSOCIATED WITH UNUSED HARDWARE RESOURCES OF PRIVATE CLOUD PROVIDERS

BACKGROUND

A cloud computing environment provides scalable and pooled computing, storage and networking resources in the form of cloud services. As examples, the cloud services may be such services as Software as a Service (SaaS); Infrastructure as a Service (IaaS); and Platform as a Service (PaaS). The cloud computing environment may be a public cloud in which the cloud services are available to the general public over the Internet or a private cloud that may be, for example, contained within a business organization's private network.

DETAILED DESCRIPTION

An organization (a public educational institution, a private educational institution, a private company, a publicly traded company, and so forth) may have a private cloud computing environment that provides private cloud services that are pooled and scaled to provide a desired storage capacity, processing power, network bandwidth, and so forth, for the organization. In general, the private cloud computing environment is a computer system, such as, for example, an onsite datacenter that includes hardware and software resources, such as clients, servers, network switches, routers, and so forth. As examples, the cloud services may include Software as a Service (SaaS), Infrastructure as a Service (IaaS), Platform as a Service (PaaS), and so forth.

In this context, the "private cloud computing environment" refers to an environment that provides cloud services not be available to the general public (except as otherwise described herein), and as such, access to the private cloud computing environment is generally limited to tenants that are associated with the organization (employees and departments of a business organization, students, faculty and researchers of an educational institution, and so forth). The private cloud computing environment, may, depending on the particular implementation, include an information technology (IT) infrastructure that is partially or wholly owned by the organization. For example, in accordance with some implementations, the private cloud computing environment may be a private cloud, in that the IT infrastructure is wholly owned by the organization; and in accordance with other implementations, the private cloud computing environment may be the private portion of a hybrid cloud that contains IT infrastructure owned by the organization and an IT infrastructure (a publicly accessible infrastructure) owned by a third party. In the following description, a "private cloud provider" refers to a provider, such as an organization, that provides one or multiple cloud services using a private cloud computing environment.

The organization may purchase and set up hardware resources for its private cloud computing environment to support not only the organization's current computing load but also to support anticipated future computing loads. The current and future computing loads for the organization may widely vary over time. For example, the computing load for an organization be cyclical, and as such, the organization may experience relatively heavier computing loads during peak business cycles, such as cycles associated with certain business hours, days, calendar months, summer holidays (for the case of educational institutions), and so forth. As another example, the organization may be a startup company, whose computing load may be relatively small at first but may be expected to ramp up over time. Therefore, during some periods of time, the hardware resources of a private cloud computing environment may be sized appropriately to efficiently satisfy the organization's computing load, and during other periods of time, the hardware resources may be underutilized (i.e., hardware resources may be idle, or unused). Unused, or idle, hardware resources, in turn, may decrease the organization's return on investment and increase the total cost of ownership for the hardware resources.

In accordance with example systems and techniques that are described herein, a cloud computing environment (called a "left cloud computing environment," or "left cloud," herein) allows public access to otherwise idle, or unused, hardware resources of multiple and independent private cloud computing environments. More specifically, the left cloud allows private cloud providers to provide cloud services for public access and be compensated for the provided cloud services using idle, or otherwise unused, hardware resources of their private cloud computing environments. By taking advantage of the left cloud, organizations that have private cloud computing environments may achieve relatively higher returns on investments on IT infrastructure and reduce their total costs of ownership of the IT infrastructure.

More specifically, in accordance with example implementations, the left cloud computing environment includes a publicly accessible left cloud portal (a portal established through an Internet-based webpage, for example), which is used as an intermediary to aggregate, market and allow access to cloud services provided by otherwise unused hardware resources of private cloud computing environments. In this manner, as further described herein, independent organizations may post information on the left cloud portal, advertising certain cloud services that are available from the organizations' private cloud computing environments (and associated with otherwise corresponding unused hardware resources of these private cloud computing environments). Through the left cloud portal, public users may set up accounts to become tenants of the left cloud computing environment; select available cloud services from private cloud providers, which are posted in a catalog of available cloud services on the left cloud portal; and be set up to have direct access to the cloud services.

Private cloud providers may use the left cloud portal in an elastic manner to offer time-limited duration cloud services to the public and regulate the extent of the offered cloud services (i.e., offer more or fewer services in a time flexible manner), depending on the current underutilized resources of the providers. In this manner, a given private cloud provider may specify time durations for the offered cloud services. As described herein, the time-limited duration cloud services may be well suited for left cloud tenants who have short term-based computing demands, and the ability of the left cloud tenants to readily migrate between private cloud providers readily accommodates left cloud tenants whose computing needs extend beyond the duration of a cloud service offered by a given private cloud provider. Moreover, the left cloud portal serves as a marketplace for cloud services, which allows private cloud providers to compete for offered cloud services and thereby allow left cloud tenants to purchase cloud services at competitive prices.

As an example, the left cloud portal may post specifications for a given available cloud service (a cloud service providing one or multiple virtual machines (VMs), for example) that is provided by a given private cloud provider. This cloud service, as specified in the listing on the left cloud portal, may have an associated duration (the cloud service may be available on weekends, on certain hours of the day, for the duration of the month, and so forth, as examples) and an associated cost (a dollar amount per hour, or per day, as examples). In response to a tenant of the left cloud computing system selecting the given cloud service, the portal communicates with the corresponding private cloud provider to set up the left cloud tenant as a corresponding tenant of the private cloud provider (i.e., set the left cloud tenant with credentials to access the cloud service) and communicate with the private cloud provider to cause the cloud provider to set up direct access for the left cloud tenant to the private cloud computing environment so that the tenant may use the clouds service.

Moreover, in accordance with example implementations, the left cloud portal may maintain an accounting of left cloud services and accordingly, may automatically send periodic invoices to the left cloud tenants, collect payments from the left cloud tenants, and set up or facilitate payments to the organizations associated with the private cloud providers for the cloud services rendered by the private cloud providers via the left cloud computing environment.

Figure 1:
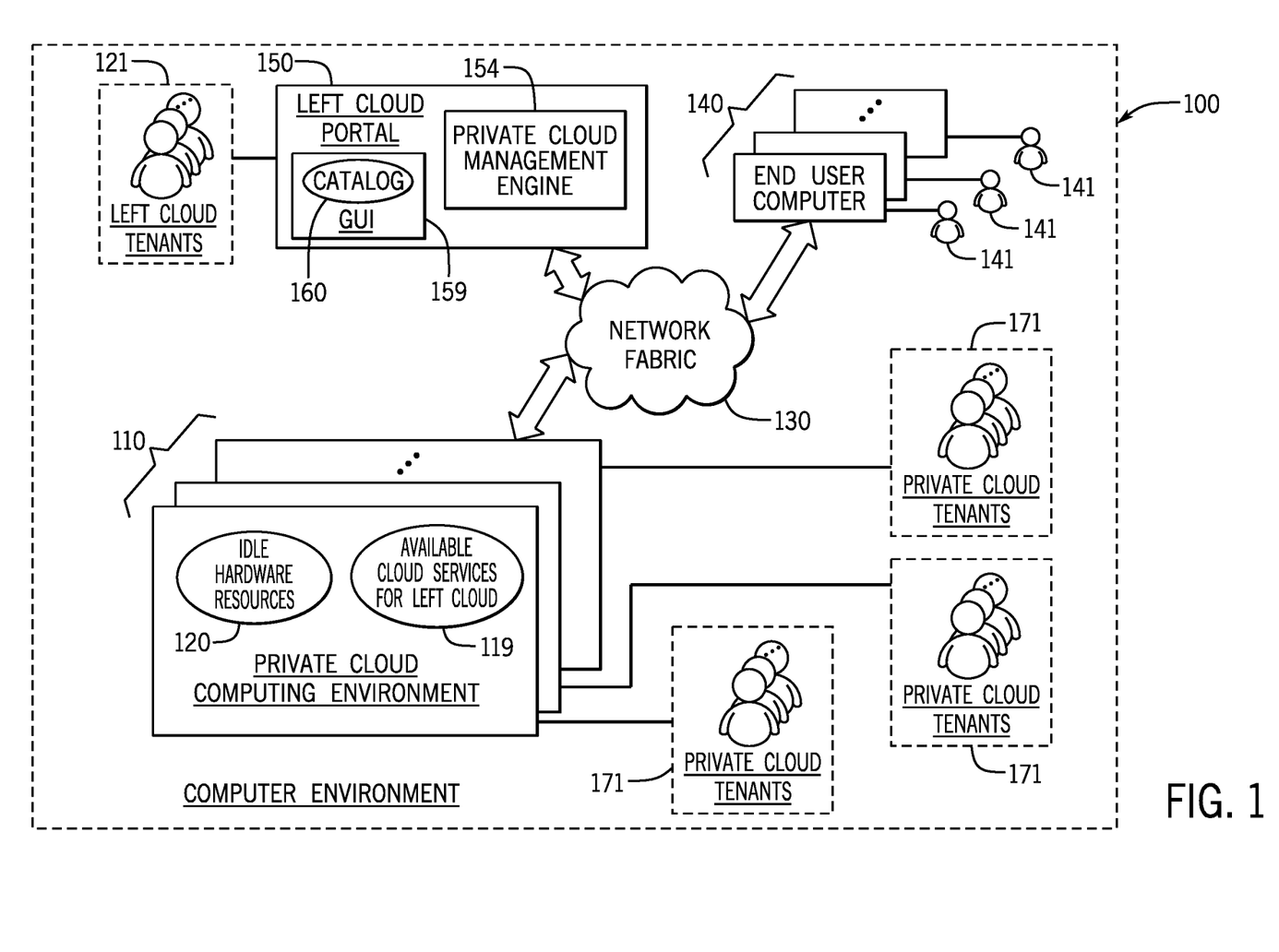
FIG. 1 is a schematic diagram of a computer environment having a left cloud that provides public access to cloud services offered by private cloud providers using otherwise unused resources of the private cloud providers according to an example implementation.

As a more specific example, in accordance with some implementations, FIG. 1 depicts a computer environment 100 that establishes a left cloud computing environment (or "left cloud"), which allows the general public to access cloud services that are offered by private cloud providers using otherwise unused resources of the private cloud providers. The computer environment 100 contains network fabric 130, which allows end users 141 to communicate with a publicly accessible, left cloud portal 150; allow the end users 141 to become left cloud tenants 121; and allow the end users 141, as left cloud tenants 121, to sign up for cloud services that are offered by the private cloud providers for purposes of establishing the left cloud tenants 121 as corresponding private cloud tenants 171 of the private cloud providers.

In general, the network fabric 130 includes public access network fabric and may include components that use protocols that are associated with any type of communication network, such as (as examples) Fibre Channel networks, iSCSI networks, ATA over Ethernet (AoE) networks, Hyper-SCSI networks, local area networks (LANs), wide area networks (WANs), global networks (e.g., the Internet), or any combination thereof.

In general, the end users 141 may use their end user computers 140 for purposes of accessing the left cloud portal 150 and accessing private cloud computing environments 110 (associated with corresponding private cloud providers) to use the private cloud provider-based cloud services offered through the left cloud computing environment, as further described herein. The end user computer 140 may be any type of processor-based machine, such as, as examples, a laptop computer, a desktop computer, a tablet computer, a smartphone, and so forth.

In general, the left cloud portal 150 allows organizations (business companies, educational institutions, and so froth) to list, or post, available cloud services 119 for the left cloud, where these available cloud services 119 are provided by idle, or otherwise unused, hardware resources 120 of the organization's private cloud computing environment 110. In this context, an unused, or "idle hardware resource" refers to an available hardware resource of the private cloud computing environment 110, such as an available mass storage space, an available compute availability, an available memory space, and so forth. The idle hardware resource 120 may or may not be part of a distinctly separate piece of hardware, depending on the particular implementation. Therefore, in accordance with an example implementation, an idle hardware resource 120 may be, for example, a physical server of the environment 110, which is otherwise completely or partially idle, i.e., has some degree available processing capability that is currently not being used. As another example, an idle hardware resource 120 may be provided by unused mass storage space of the private cloud computing environment 110 and may or may not be physically separate from other used and utilized mass storage devices of the private cloud computing environment 110.

In accordance with example implementations, the left cloud portal 150 includes a private cloud management engine 154 and a graphical user interface (GUI) 159. The GUI 159, in accordance with example implementations, displays one or multiple pages of a catalog 160, in which private cloud providers may post listings of available cloud services. The GUI 159, in general, provides input controls (buttons, navigational controls, and so forth) and displays content (via clickable tabs, windows, and so forth) to display the catalog 160; allow private cloud providers to post available cloud service 119 listings; allow end users 141 to establish left cloud accounts to become left cloud tenants 121; allow left cloud tenants 121 to browse the catalog 160 and select cloud services; collect subscription fees from left cloud tenants 121; provide account statements to left cloud tenants 121; provide statements for private cloud providers; set up payments and other account information for private cloud providers; allow private cloud providers to manage the listed available cloud services so that the listed services may be relatively elastic and may be provided or retracted as needed by the cloud providers; and so forth.

More specifically, in accordance with example implementations, the GUI 159 may display a web page showing a catalog 160 of the available cloud services 119 that are provided by the private cloud computing environments 110. The GUI 169 may interact with a private cloud management engine 159 of the left cloud portal 159. A left cloud tenant 121 may select one or multiple available cloud services 119 represented in the catalog 160; and the private cloud management engine 154 may correspondingly communicate with the corresponding private cloud computing environment 110 to set up the left cloud tenant as a corresponding tenant of the private cloud computing environment 110. Moreover, the private cloud management engine 154 may communicate with the private cloud computing environment 110 to set up the private cloud computing environment 110 for direct access so that the corresponding end user computer 141 may be used to directly access the private cloud computing environment 110 via the network fabric 130 without the left cloud portal 150.

Due to the short term nature of the cloud services that are available and provided through the left cloud computing environment, a given left cloud tenant 121 may be reasonably anticipated to move from one private cloud computing environment 110 (i.e., one private cloud provider) to the next in a relatively short period of time. As such, it may be reasonably expected that a given left cloud tenant 121 may migrate images associated with its used cloud services from one private cloud computing environment 110 to the next over short periods of time. To facilitate this migration, in accordance with some implementations, the private cloud computing environments 110 are directed to homogenous cloud computing services, i.e., cloud services that are associated with the same cloud standard, or specification, in common. For example, in accordance with some implementations, the private cloud computing environments 110 may be all OpenStack clouds or may be all VMWare clouds, as just a few examples.

Figure 2:
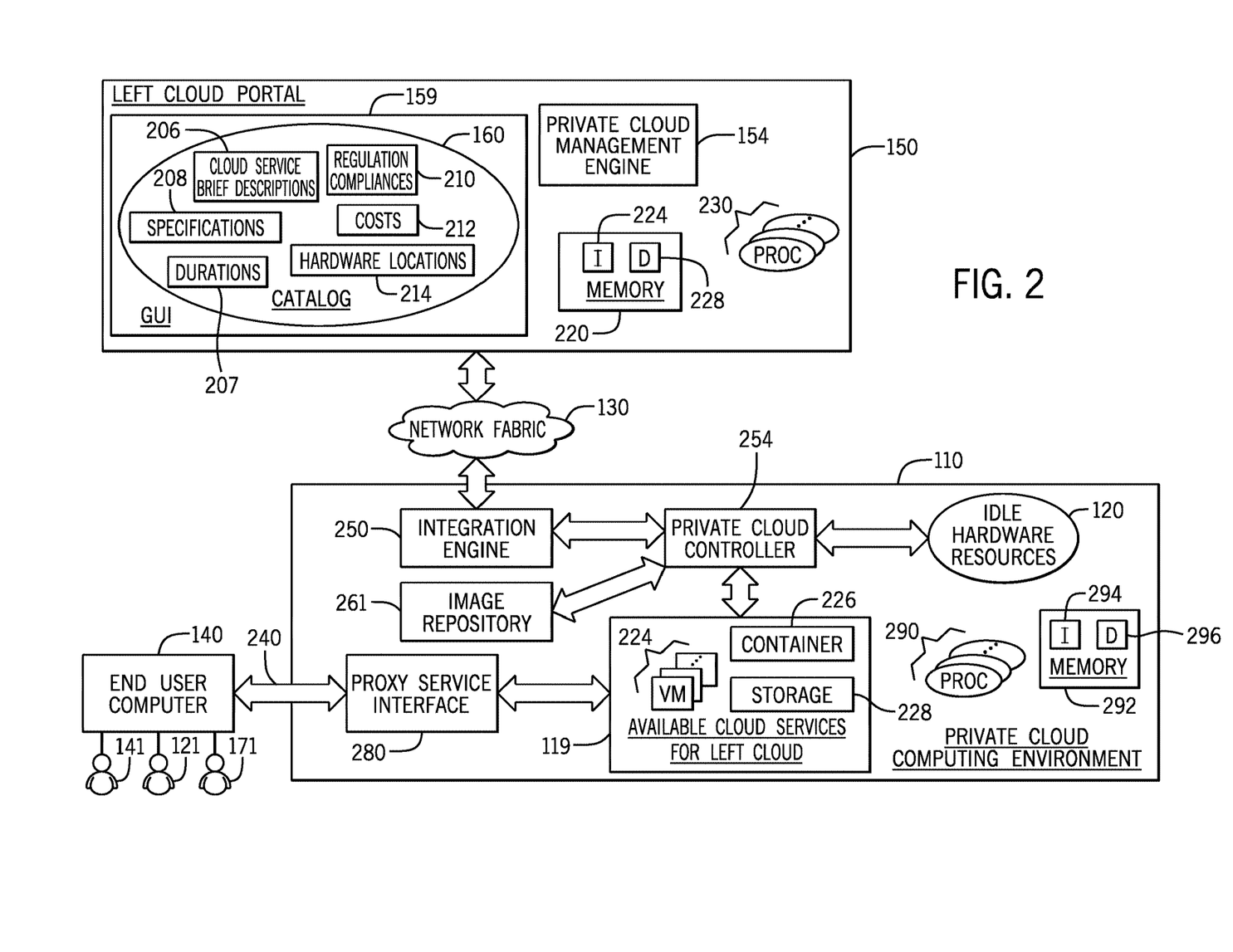
FIG. 2 is a more detailed schematic diagram of a left cloud portal and a private cloud computing environment of FIG. 1 according to an example implementation.

Referring to FIG. 2 in conjunction with FIG. 1, in accordance with some implementations, the catalog 160 of the left cloud portal 150 may list the following features of the available cloud services 119. The catalog 160 may display a list of available cloud services 119, including brief descriptions 206 of the available cloud services 119 and associated specifications 208 for these cloud services. Moreover, for each available cloud service 119, the catalog 160 may, in addition to the brief descriptions 206 and specifications 208, display an associated duration 207, cost 212 and hardware location 214. Moreover, a particular listing may also represent a particular governmental regulation compliance for the available cloud service 119. For example, for a particular available cloud service 119, the catalog 160 may contain the following listing: "10 VMs for $10 per day and GDPR compliant" (indicating compliance with the General Data Protection Regulation (GDPR).

As illustrated in FIG. 2 for a specific private cloud computing environment 110, the environment 110 may contain an integration engine 250 that communicates with the left cloud portal 150 and a private cloud controller 254 of the private cloud computing environment 110 for purposes of integrating a given left cloud tenant 121 into the back-end private cloud computing environment 110 as a private cloud tenant 171. In accordance with some implementations, the integration engine 250 may communicate with the left cloud portal 150 for purposes of mapping the left cloud tenant 121 to a corresponding private tenant ID (and credentials) of the private cloud computing environment 110. As an example, in accordance with some implementations, the integration engine 250 may use a specific keyword appendage, such as "left" and add this appendage to its tenant names associated with the users from the left cloud for purposes of differentiating left cloud tenants from in-house tenants. In accordance with example implementations, the private cloud computing environment 110 may use its authentication mechanism used for its in-house tenants to authenticate the left cloud tenants.

In accordance with some implementations, the integration engine 250 may regulate a quota, which represents a portion of the private cloud computing environment 110, which is available for left cloud tenants. In this manner, in accordance with example implementations, the quota represents an amount of available cloud services 119 for the left cloud tenants 171 from the private cloud computing environment 110. In accordance with example implementations, the integration engine 250 may group the cloud services used by the left cloud tenants 171 and change the quota as the services assigned to the tenants 171. For example, if the private cloud computing environment 110 has ten available VMs, and a particular left cloud tenant signs up for 3 VMs, then the integration engine 250 decrements the quota so that seven VMs are now available. Likewise, if, for example, 10 VMs are available and a current left cloud tenant frees up three additional VMs by terminating its use of these VMs, then the integration engine 250 may change the quota to thirteen VMs.

The integration engine 250 may further, in accordance with example implementations, control the images that are available for a given left cloud tenant. For example, in accordance with some implementations, the private cloud computing environment 110 may contain an image repository 261 that may store images that are downloaded for the left cloud tenants 121 as well as standard images (Glance images in the case of OpenStack cloud, for example). Left cloud tenants 121 may also upload their own images via the left portal 150, and the private cloud management engine 154 may correspondingly communicate with the integration engine 250 for purposes of uploading the image provided by the left cloud tenant 121 to the image repository 261. The private cloud controller 254 of the private cloud computing environment 110 may perform checks on the uploaded images, such as security and virus checks, correctness checks of image format, and so forth. Moreover, the portal 150 may maintain metadata representing a description of the images that are uploaded by a given left cloud tenant 121 so that should the left cloud tenant move to another private cloud computing environment 110, the image(s) may be migrated to the other private cloud computing environment 110. In other words, in accordance with some implementations, the left cloud portal 150 may not store any images for the left cloud tenants 141, as the left cloud portal 150 may store metadata describing the images so that if a given left cloud tenant 121 moves to another private cloud computing environment 110, the left cloud portal 151 has information to send to the first private cloud computing environment 110 describing the images to be migrated to the new private cloud computing environment 110.

As depicted in FIG. 2, in accordance with example implementations, the private cloud controller 254 has access to the image repository 261 and hardware resources of the private cloud computing environment 110, including the idle hardware resources 120. The private cloud controller 254 may perform the appropriate deployment of cloud computing resources to provide one or multiple cloud services for the private cloud computing environment 110, including the cloud services 119 for the left cloud, such as VM services 224, container services 226, storage services 228, network services, and so forth.

After the integration engine 250 sets up the private cloud computing environment 110 for a particular left cloud tenant 121 and loads/configures the associated image(s), the integration engine 250 may then set up direct access for the left cloud tenant 121 to the private cloud computing environment 110. Using this direct access, the left cloud tenant 121 may use the credentials associated with the corresponding private cloud tenant 141 to directly access the private cloud computing environment 110 and access the corresponding cloud services. For purposes of this direct access, in accordance with some implementations, the integration engine 250 may set up an external Internet Protocol (IP) address, which allows the left cloud tenant 121 (via the corresponding end user computer 140) to access the provided cloud service(s) using, for example, remote desktop access (for a Windows operating system, for example) or a Secure Shell (SSH) access (for the case of a Linux operating system), as examples.

In accordance with further example implementations, the integration engine 250 may set up a proxy service interface 280 and assign the interface 280 to the tenant 141. In accordance with example implementations, the proxy service interface 280 performs the appropriate authentication (using a certificate, for example) and restricts the tenant's access to the resources assigned to the tenant. It is noted that although FIG. 2 depicts a single proxy service interface 280, in accordance with example implementations, at a given time, the private cloud computing environment 110 may have multiple such proxy service interfaces 280 to handle multiple tenants 141 for the left cloud simultaneously.

In accordance with example implementations, the left cloud portal 150 may be established by one or multiple actual, physical machines that include actual hardware and actual machine executable instructions (or "software"). It is noted that, in accordance with example implementations, the physical machine(s) may create one or multiple virtual machines; and the components of the left cloud portal 150, such as the private cloud management engine 154 and GUI 159, may execute on one or multiple virtual machines. In accordance with example implementations, the left cloud portal 150 may include one or multiple physical hardware processors 230, such as one or multiple central processing units (CPUs), one or multiple CPU cores, and so forth. Moreover, the left cloud portal 150 may include a memory 220. In general, the memory 220 is a non-transitory memory that may be formed from, as examples, semiconductor storage devices, phase change storage devices, magnetic storage devices, memristor-based devices, a combination of storage devices associated with multiple storage technologies, and so forth.

Regardless of its particular form, the memory 220 may store various data 228 (data representing uploaded images, billing information, left cloud account information, and so forth). The memory 220 may also store machine executable instructions 224 and/or application data (or "software"), which are executed by the processor(s) 230. In general, the machine executable instructions 224, when executed by one or multiple processors 230, cause the processor(s) 230 to form one or multiple components of the left cloud portal 150, such as, for example, the private cloud management engine 154, the GUI 159, and so forth. In accordance with example implementations, one or multiple components of the left cloud portal 150 may be formed from hardware that does not execute machine executable instructions, such as, for example, an Application Specific Integrated Circuit (ASIC) or a field programmable gate array (FPGA).

In a similar manner, in accordance with example implementations, the private cloud computing environment 110 may include one or multiple processors 290 and a memory 292. The memory 292 may store machine executable instructions 294 and data 296 pertaining to operation of the private cloud computing environment and is a non-transitory memory, similar to the memory 220 of the portal 150. As examples, the data 296 may be data related to the left cloud tenants 121, the corresponding private cloud tenants 171, quota information, and so forth. Moreover, the machine executable instructions 294, when executed by one or multiple processors 220, may cause the processors 220 to provide various components of the private cloud computing environment 110, such as, for example, the integration engine 250, the private cloud controller 254, the proxy service interfaces 280, and so forth.

Figure 3:
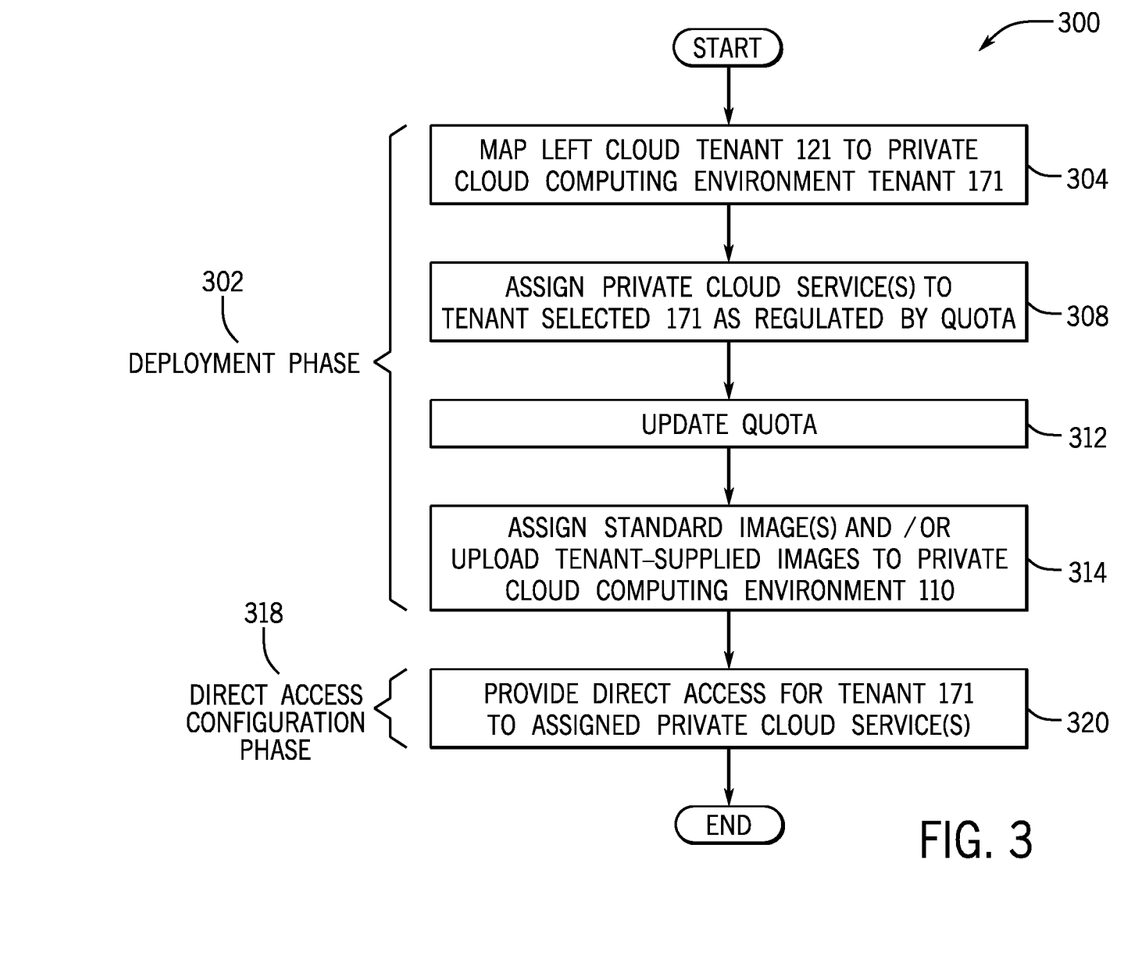
FIG. 3 is a flow diagram depicting a technique to configure a private cloud computing environment to provide a cloud service for the left cloud according to an example implementation.

Referring to FIG. 3 in conjunction with FIG. 2, in accordance with example implementations, the integration engine 250 may perform a technique 300 for purposes of setting up a particular left cloud tenant 121 to access and use one or multiple available cloud services 119 provided by the corresponding private cloud computing environment 110. In a first deployment phase 302 of the technique 300, the integration engine 250 sets up the left cloud tenant 121 and correspondingly configures the private cloud computing environment 110. Pursuant to the technique 300, the integration engine 250 maps (block 304) the left cloud tenant 121 to a private cloud computing tenant 141 and assigns (block 308) one or multiple available private cloud services 119 to the tenant 141, as regulated by the corresponding quota. Moreover, after the assignment, the integration engine 250 may update the quota, pursuant to block 312. The integration engine 250 may then assign (block 314) one or multiple standard images and/or upload tenant-supplied images to the image repository 261. In the next part 318 of the technique 300, the integration engine 250 may then set up direct access in a direct access configuration phase 318. More specifically, the integration engine 250 may provide direct access to the private cloud service or services by setting up an external IP address, setting up a proxy service, and so forth, as discussed above.

The overall cost of resources is based on the costs to the cloud service provider for specific resources, with a margin being left to the left cloud provider. The dynamics with the supply and demand may play a vital role in determining the costs for the left cloud services and may be relatively inexpensive for the end user, as compared to cloud service offerings from public cloud providers.

Due to the temporary durations of the left cloud services, a customer may, from time to time, move from one private cloud computing environment 110 to another. For example, a particular private cloud provider may have its servers unoccupied, desire to make the servers available in the left cloud for a certain period of time (10 months, for example) and then desire to have the servers available and off the left cloud market place during the residual time (2 months, for example). Therefore, if a particular customer deploys in this private cloud, the customer may move to another cloud when the private cloud provider wants its resources back. Therefore, the customer migrates the setup to another available private cloud computing environment 110. Because, in accordance with example implementations, the private cloud computing environments 110 are homogenous, migration may be relatively easy.

It is noted that the duration of the private cloud services may vary, such as being a few hours in a day or a few days in a week. For example, a particular organization may use most of its resources during office hours or a particular percentage (fifty percent, for example) of the day. The remaining hours may be free to be used by the tenants of the left cloud. On the other hand, there may be many compute intensive applications, such as scientific research applications, image processing applications, and so forth, which use a relatively large amount of compute power. However, this compute power does not need to be at one place. As such, the compute requirements may be distributed among compute resources of multiple private cloud providers.

The above-described left cloud allows an elastic approach to cloud services. In this manner, a certain portion of the resources of the private cloud computing environments 110 is available in the left cloud, with the assumption that whenever the cloud service provider wants the resource back, the cloud service provider may achieve this within a relatively reasonable time, such as one day, one week or a similarly fixed time decided based on business requirements. Moreover, as demands may vary and may not be predictable, in accordance with example implementations, the private cloud providers may be able to allocate resources to the left cloud or reallocate resources from the left cloud, in a reasonable time, depending on the current demand of the cloud provider.

In accordance with example implementations, the left cloud may be useful for such users as small startups, which have relatively less funding and may acquire left cloud resources much more cheaply, as compared to services available from public cloud providers. Moreover, small businesses whose information technology (IT) requirements are relatively small, may be potential users of the left cloud. Moreover, organizations that use relatively cheap cloud resources for a short time for activities such as marketing, income tax returns, school admissions, amateur sporting events, and so forth, may benefit from being users of the left cloud. Scientific applications that need relatively large amounts of compute power may also opt for left cloud processing, as their requirements range from a few hours to a few days. Data mining, image processing, and so forth, which is relatively a huge amount of computing power for short durations may also benefit from the left cloud.

Figure 4:
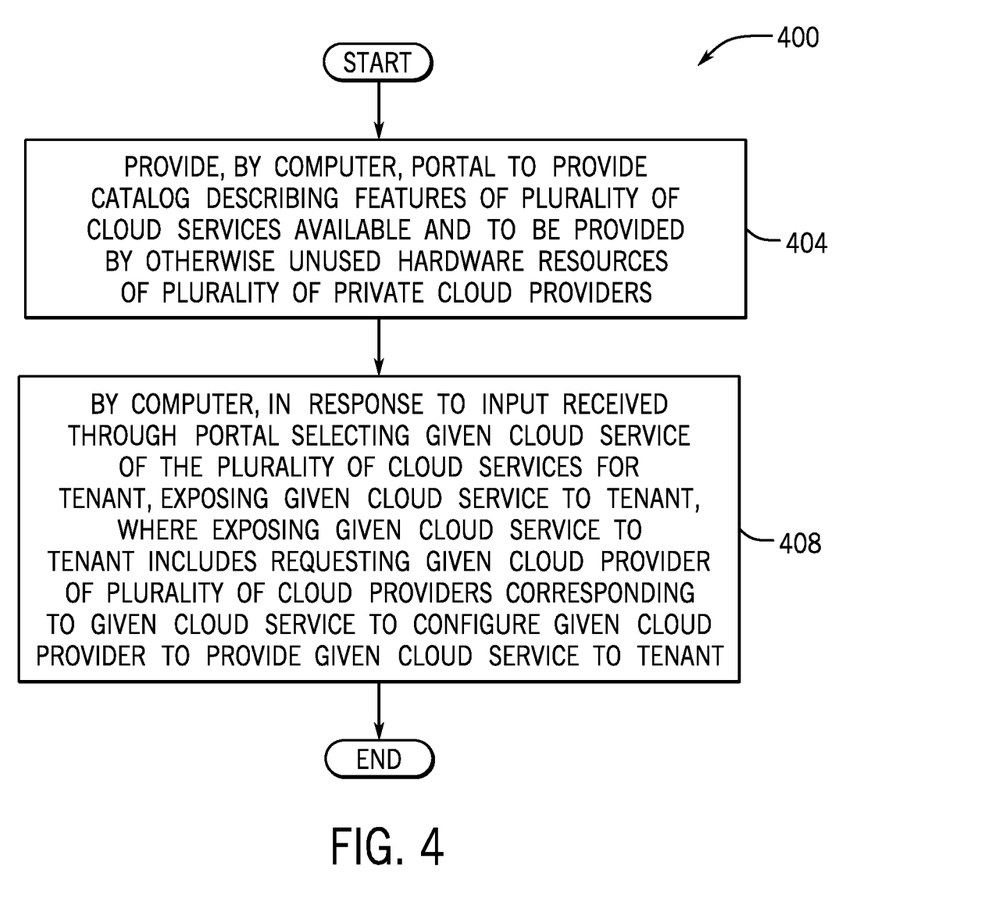
FIG. 4 is a flow diagram depicting a technique to use a portal to select and set up a cloud service provided by a private cloud provider according to an example implementation.

Thus, referring to FIG. 4, in accordance with example implementations, a technique 400 includes providing (block 400), by a computer, a portal to provide a catalog describing features of a plurality of cloud services available and to be provided by otherwise unused hardware resources of a plurality of private cloud providers. The technique 400 includes, by the computer, in response to input received through the portal selecting a given cloud service for a tenant, exposing (block 408) the given cloud service to the tenant. Exposing the given cloud service to the user includes requesting a given cloud provider corresponding to the given cloud service to configure the given cloud provider to provide the given cloud service to the tenant.

Figure 5:
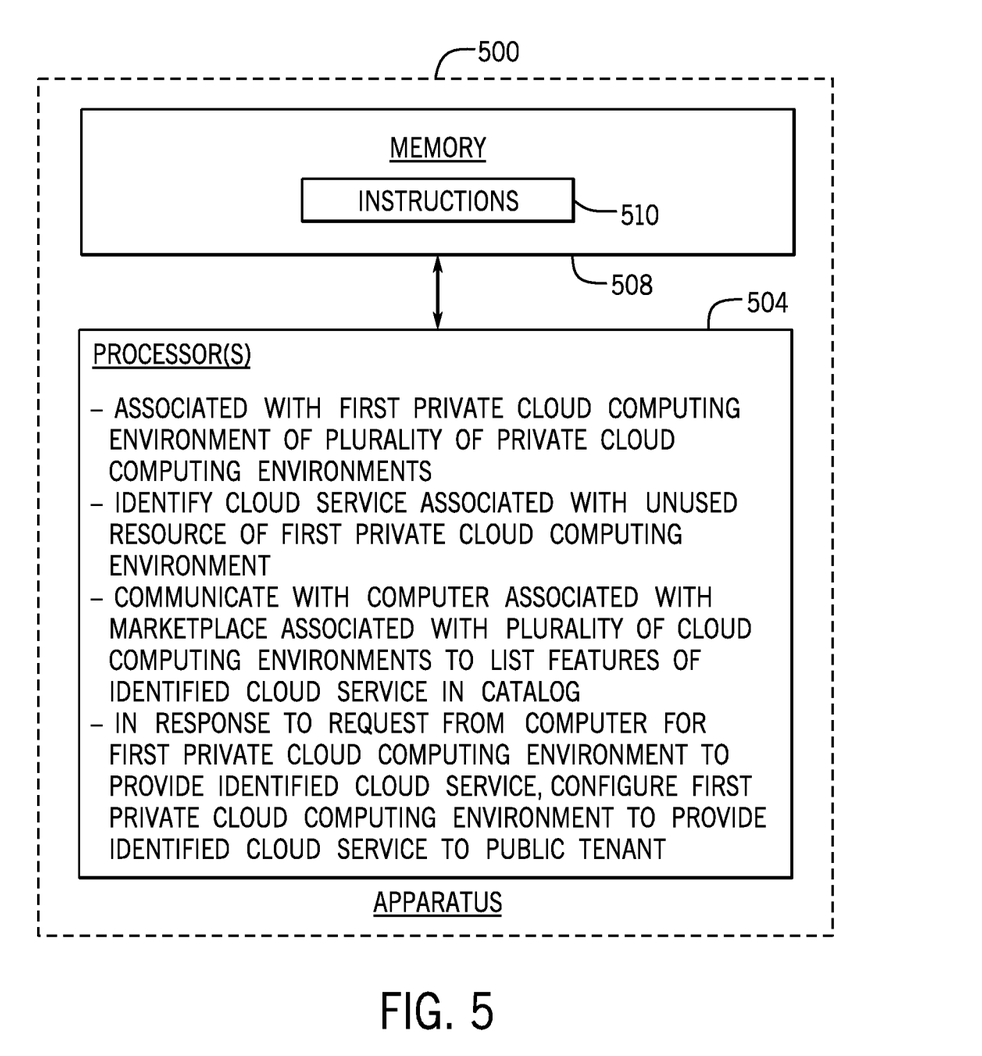
FIG. 5 is a schematic diagram of an apparatus to configure a private cloud computing environment to provide a cloud service to a tenant according to an example implementation.

Referring to FIG. 5, in accordance with example implementations, an apparatus 500 includes at least one processor 504 and a memory 508. The processor(s) 504 is associated with a first private cloud computing environment of a plurality of private cloud computing environments. The memory 508 stores instructions 510 that, when executed by the processor(s) 504, cause the processor(s) 504 to identify a cloud service associated with an unused resource of the first private cloud computing environment; communicate with a computer that is associated with a marketplace associated with the plurality of cloud computing environments to list features of the identified cloud service in a catalog; and in response from a request from the computer for the first private cloud computing environment to provide the identified cloud service, configuring the first private cloud computing environment to provide the identified cloud service to a public tenant.

Figure 6:
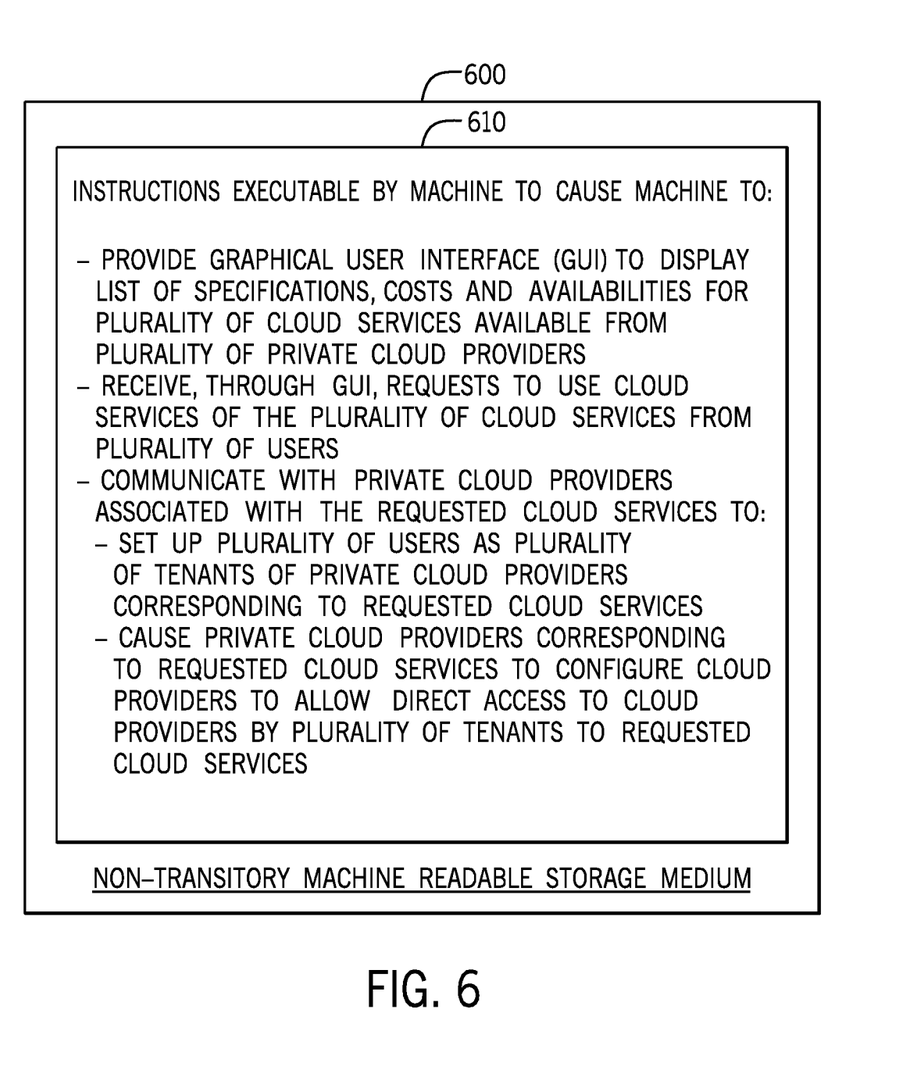
FIG. 6 is an illustration of machine executable instructions that, when executed by a machine, cause the machine to use a graphical user interface (GUI) to set up and configure the private cloud providers to provide cloud services according to an example implementation.

In accordance with example implementations, a non-transitory machine readable storage medium 600 stores instructions 610 that, when executed by the machine, cause the machine to provide an intermediary graphical user interface (GUI) to display specifications, costs and availabilities for a plurality of cloud services available from a plurality of private cloud providers. The instructions 610, when executed by the machine, cause the machine to receive, through the GUI, requests to use cloud services of the plurality of cloud services from a plurality of users; and communicate with the private cloud providers associated with the requested cloud services to setup the plurality of users as a plurality of tenants of the private cloud providers corresponding to the requested cloud services, and cause the private cloud providers corresponding to the requested cloud services to configure the cloud providers to allow direct access by the plurality of tenants to the requested cloud services.

In accordance with example implementations, the systems and techniques that are described herein may provide one or more of the following advantages. Organizations may open up their private cloud space for effective usage of inhouse resources for external users and earn revenue. The architecture allows existing private cloud solutions with minimal modifications. The mapping of external left cloud tenants to private cloud tenants facilitates the ease of making the private cloud services available. The availability of the catalog supplying different parameters, such as resource specifications, supporting features, geographic locations, regulation compliances and costs, makes it relatively easy for the left cloud tenants to select private cloud services. The actual images being stored in the private cloud computing environments, with the metadata being stored in the left cloud portal, makes it possible to handle relatively large loads in the portal. The overall regulation in terms of security, duration of service, and ability to readily migrate to other private clouds allows the use of the left cloud with customer awareness and agreement.

The left cloud may have one or more of the following features, depending on the particular implementation. Providing the left cloud portal may include providing a catalog that describes costs associated with the plurality of cloud services. Advantages of providing such a catalog may include the benefit of a market place being created for utilizing unused hardware resources of private cloud providers and allowing competition to provide relatively low cost services to end users. Providing the portal may include providing a catalog that includes describing durations in which corresponding cloud services are available. This may have the advantages of allowing private cloud providers to apportion their hardware resources according to cyclical demands and allow an elastic approach to allocating resources for the left cloud. Providing the portal may include providing a catalog that describes government regulations and/or geographical resource locations associated with the cloud services and/or hardware associated with the cloud services. This may have such benefits as ensuring that the received cloud services comply with government regulations and/or are located in certain geographic locations for regulation compliance. Providing the portal may include providing an Internet accessible web page, which has the advantage of allowing easy public accessibility of the portal. Usage may be tracked of the plurality of tenants of the provided cloud services, which has the advantage of allowing a third party to manage aspects pertaining to accounts, billing, revenue collection, and so forth, for the left cloud. Metadata may be stored in association with the portal describing an image that is migrated by a tenant to a given cloud provider, which has the advantage of allowing bulk data to be stored on the private cloud provider's system, and allow minimal resources to be consumed by the left cloud portal.

Access rights of a public tenant to a private cloud computing environment may be segregated from the use of the private cloud computing environment by a plurality of private tenants, which has the advantages of allowing security and access to be controlled so that the public tenants of the left cloud cannot access sensitive or confidential information associated with the private cloud environment. The public tenant may upload an image to the private cloud computing environment, which increases the flexibility of the left cloud for cloud computing services. Cloud computing resources may be migrated between private cloud computing environments, which enhance the use of the left cloud for providing relatively short duration cloud services.

An Internet Protocol (IP) address may be assigned to a cloud service to allow a public tenant to access the cloud service, which avoids burdening the left cloud portal with left cloud tenant access to the private cloud service. A proxy service may be configured to allow public tenant access to a cloud service, which avoids burdening the left cloud portal with access to the private cloud service. A tenant quota associated with a cloud service may be updated based on tenant usage, for purposes of allocating and maintaining the use of a dedicated portion of the private cloud computing environment to the left cloud. A plurality of private cloud providers may be associated with a virtualization standard that is shared in common, which facilitates migration of left cloud tenants among the private cloud providers.

A graphical user interface (GUI) may be provided by the left cloud portal, thereby facilitating advertising and selection of cloud services from the left cloud and providing information, such as specifications, or a duration for which a given cloud service is available. This allows left cloud tenants to efficiently find cloud services as well as provides an elastic approach to providing and finding cloud services for the perspective of both the private cloud provider and the left cloud tenants. The list of available cloud services may be updated in response to communications from the private cloud providers, thereby providing elastic control of the available cloud services, which permits private cloud services to add or remove cloud services to accommodate changing needs of the cloud provider.

The left cloud may have other and/or different features and provide different and/or other advantages, in accordance with further example implementations.

While the present disclosure has been described with respect to a limited number of implementations, those skilled in the art, having the benefit of this disclosure, will appreciate numerous modifications and variations therefrom. It is intended that the appended claims cover all such modifications and variations

What is claimed is:

1. A method comprising:
   providing, by a computer, a portal to provide a catalog describing features of a plurality of cloud services available and to be provided by otherwise unused hardware resources of a plurality of independent private cloud providers, wherein each private cloud provider of the plurality of independent private cloud providers is accessible to a plurality of in-house tenants associated with the private cloud provider and a plurality of tenants representing members of the public that set up accounts with the portal;
   by the computer, in response to input received through the portal selecting a given cloud service of the plurality of cloud services for a tenant of the plurality of tenants, exposing the given cloud service to the tenant, wherein exposing the given cloud service to the tenant comprises requesting a given cloud provider of the plurality of independent private cloud providers corresponding to the given cloud service to configure the given cloud provider to provide the given cloud service to the tenant;
   causing, by the computer, a private cloud computing environment associated with the given cloud provider to generate a private tenant ID corresponding to the tenant by adding a keyword appendage to a name of the tenant to differentiate the tenant from the plurality of in-house tenants of the given cloud provider; and
   accommodating, by the computer, a service duration of the tenant exceeding an availability of the given cloud service from the given private cloud provider by facilitating migration of an image associated with the given cloud service from the given private cloud provider to a second private cloud provider of the plurality of independent private cloud providers for a remainder of the service duration, including limiting the plurality of independent private cloud providers to those providing homogeneous cloud computing services.

2. The method of claim 1, wherein providing the portal to provide the catalog comprises providing a catalog describing costs associated with the plurality of cloud services.

3. The method of claim 1, wherein providing the portal to provide the catalog comprises providing a catalog describing durations in which corresponding cloud services are available.

4. The method of claim 1, wherein providing the portal to provide the catalog comprises providing a catalog describing government regulations or resource locations associated with the plurality of cloud services.

5. The method of claim 1, the method further comprising tracking usage of the plurality of tenants of the plurality of cloud services.

6. The method of claim 1, the method further comprising storing metadata in association with the portal describing an image migrated by the tenant to the given cloud provider.

7. The method of claim 1, further comprising regulating availability of the given cloud service based on a quota associated with the given cloud service, wherein the quota represents an amount of available cloud services for the tenant from the private cloud computing environment.

8. An apparatus comprising:
   at least one processor associated with a first private cloud computing environment of a plurality of private cloud computing environments each associated with a respective private cloud provider of a plurality of independent private cloud providers, wherein each private cloud provider of the plurality of independent private cloud providers is accessible to a plurality of in-house tenants associated with the private cloud provider and a plurality of public tenants representing members of the public that set up accounts with a portal; and
   a memory to store instructions that, when executed by the at least one processor, cause the at least one processor to:
   identify a cloud service associated with an unused resource of the first private cloud computing environment;
   communicate with a computer associated with a marketplace associated with the plurality of private cloud computing environments to list features of the identified cloud service in a catalog for display to the plurality of public tenants via the catalog;

in response to a request from the computer for the first private cloud computing environment to provide the identified cloud service, configure a first private cloud provider of the plurality of independent private cloud providers associated with the first private cloud computing environment to provide the identified cloud service to a public tenant of the plurality of public tenants;

cause the first private cloud computing environment to generate a private tenant ID corresponding to the public tenant by adding a keyword appendage to a name of the public tenant to differentiate the public tenant from the plurality of in-house tenants of the first private cloud provider; and accommodate a service duration of the tenant exceeding an availability of the identified cloud service from the first private cloud computing environment by facilitating migration of an image associated with the identified cloud service from the first private cloud environment to a second private cloud computing environment of the plurality of private cloud computing environments for a remainder of the service duration, including limiting the plurality of private cloud computing environments to those providing homogeneous cloud computing services.

9. The apparatus of claim 8, wherein the instructions, when executed by the at least one processor, cause the at least one processor to control access rights of the public tenant to segregate use of the first private cloud computing environment by the public tenant from use of the first private cloud computing environment by the plurality of in-house tenants.

10. The apparatus of claim 8, wherein the instructions, when executed by the at least one processor, cause the at least one processor to upload an image provided by the public tenant to the first private cloud computing environment.

11. The apparatus of claim 8, wherein the instructions, when executed by the at least one processor, cause the at least one processor to migrate a cloud computing resource to the first private cloud computing environment.

12. The apparatus of claim 8, wherein the instructions, when executed by the at least one processor, cause the at least one processor to assign the identified cloud service to an external Internet Protocol (IP) address to allow the public tenant to access the identified cloud service.

13. The apparatus of claim 8, wherein the instructions, when executed by the at least one processor, cause the at least one processor to configure a proxy service to allow the public tenant to access the identified cloud service.

14. The apparatus of claim 8, wherein the instructions, when executed by the at least one processor, cause the at least one processor to update a tenant quota associated with the identified cloud service based on tenant usage of the identified cloud service.

15. A non-transitory machine readable storage medium to store instructions that, when executed by a machine, cause the machine to:

provide a graphical user interface (GUI) via a portal to display a list of specifications, costs and availabilities for a plurality of cloud services available from a plurality of independent private cloud providers, wherein each private cloud provider of the plurality of independent private cloud providers is accessible to a plurality of in-house tenants associated with the private cloud provider and a plurality of tenants representing members of the public that set up accounts with the portal;

receive, through the GUI, requests to use a cloud service of the plurality of cloud services from a user; and communicate with a given private cloud provider of the plurality of independent private cloud providers, wherein the given private cloud provider is associated with the requested cloud service to:

set up the user as a tenant of the plurality of tenants to facilitate access to the given private cloud provider corresponding to the requested cloud service by causing a private cloud computing environment associated with the given cloud provider to generate a private tenant ID corresponding to the tenant by adding a keyword appendage to a name of the tenant to differentiate the tenant from a plurality of in-house tenants of the given private cloud provider;

cause the given private cloud provider corresponding to the requested cloud service to configure the cloud provider to allow direct access to the cloud provider by the tenant to the requested cloud service; and accommodate a service duration of the tenant exceeding an availability of the requested cloud service from the given private cloud provider by facilitating migration of an image associated with the requested cloud service from the given private cloud provider to a second private cloud provider of the plurality of independent private cloud providers for a remainder of the service duration, including limiting the plurality of independent private cloud providers to those providing homogeneous cloud computing services.

16. The storage medium of claim 15, wherein the GUI provides a duration associated with at least one of a date or a time for which a given cloud service of the plurality of cloud services is available.

17. The storage medium of claim 15, wherein the instructions, when executed by the machine, cause the machine to update the list in response to communications from the plurality of independent private cloud providers.

18. The storage medium of claim 15, wherein the direct access comprises access to a given cloud provider of the plurality of independent private cloud providers using a cloud service assigned to an Internet Protocol (IP) address or direct access provided by a proxy service.

19. The apparatus of claim 8, wherein private cloud computing environments of the plurality of private cloud computing environments share a common cloud standard.

20. The storage medium of claim 15, wherein the instructions, when executed by the machine, cause the machine to provide the GUI to display government regulations associated with the plurality of cloud services.

* * * * *